(12) United States Patent
Lawson

(10) Patent No.: US 7,156,106 B2
(45) Date of Patent: Jan. 2, 2007

(54) FOLDABLE DECORATIVE HAIR BAND

(76) Inventor: Deborah Lawson, 14 Goldfinch Rd., Audubon, NJ (US) 08106

( * ) Notice: Subject to any disclaimer, the term of this patent is extended or adjusted under 35 U.S.C. 154(b) by 470 days.

(21) Appl. No.: 10/792,565

(22) Filed: Mar. 3, 2004

(65) Prior Publication Data

US 2005/0194019 A1    Sep. 8, 2005

(51) Int. Cl.
*A45D 8/12* (2006.01)
(52) U.S. Cl. .......................... 132/275; 2/174
(58) Field of Classification Search .............. None
See application file for complete search history.

(56) References Cited

U.S. PATENT DOCUMENTS

| | | | |
|---|---|---|---|
| 2,555,578 A * | 6/1951 | Davis | 351/52 |
| 4,958,923 A * | 9/1990 | Rosenson | 351/52 |
| 5,181,051 A * | 1/1993 | Townsend et al. | 351/52 |
| 5,427,123 A | 6/1995 | Odenthal | |
| 5,449,008 A | 9/1995 | Yeh | |
| D380,865 S | 7/1997 | Shing | |
| 5,729,321 A * | 3/1998 | Wielhouwer | 351/44 |
| 5,826,597 A | 10/1998 | Chou | |
| 5,937,872 A | 8/1999 | Wang | |
| 6,102,540 A * | 8/2000 | Chen | 351/47 |
| 6,688,316 B1 * | 2/2004 | Klug | 132/286 |
| 6,764,175 B1 * | 7/2004 | Chen | 351/47 |

\* cited by examiner

*Primary Examiner*—Todd E. Manahan
(74) *Attorney, Agent, or Firm*—Marvin C. Gaer

(57) ABSTRACT

This invention discloses an inexpensive, foldable, decorative hair band, which can be worn like sunglasses, pushed up above the wearer's forehead, comprising two sunglasses temple earpieces attached by folding sunglasses hinges to the opposite ends of a slightly outwardly bowed bridging strip section, that fits across the wearer's forehead, and a detachable decorative plate, instead of lenses, which fits onto and over this bridging strip, and which has a design on its outer surface. This decorative plate section can be easily connected and disconnected, from the bridging strip, so that the decorative plate can be replaced with another, having a different decorative design, as the wearer desires.

4 Claims, 4 Drawing Sheets

FOLDABLE DECORATIVE HAIR BAND

BACKGROUND OF THE INVENTION

This invention is concerned with decorative interchangeable hair band fashion accessories. Many women use hair bands or hair clasps as decorative fashion accessories. A variety of these hair bands are in common use and include colored ribbons, jeweled hair pins and combs and elastic and plastic decorative curved hair clasps. Decorative sunglasses are also often used in this way when they are casually pushed up above the forehead, with each temple earpiece inserted into the wearer's hair, on opposite sides of the forehead, and held in place by the tautness of the hair and the inward pressure of the temple earpieces. A limitation of many of these decorative accessories, particularly the sunglasses, is that they do not provide a means for varying the decorative design. Others involve a certain amount of unique structure in order to change the decorative design, thus increasing the cost of producing and purchasing these products.

SUMMARY OF THE INVENTION

This invention discloses a foldable decorative hair band which is based on a semi-elastic or plastic frame having the folding hinged temple earpieces found on sunglasses. In particular, this foldable hair band comprises two spectacle or sunglasses temple earpieces attached, by folding sunglasses hinges, to the opposite ends of a flat or slightly outwardly curved or arcuate narrow bridging strip, which replaces the lens section of the sunglasses. This bridging strip has a form resembling a flattened, bowed train rail provided with two indented channels, each running along the length of the narrow opposite lateral side edges of this strip. At the opposite ends of this bridging strip are attached the temple earpieces by the folding hinges. These open side channels allow interchangeable, slightly bowed or arcuate, decorative, slotted, sleeve plates to be attached to the frame by sliding the slot forming inward curved lateral edges of these plates into the lateral indented channels of the bridging strip member. The shape and surface area of this decorative sleeve plate is such that it just covers the bridging strip, its cross section, formed by its inward curved lateral edges, is a flattened letter "C". The decorative design on the outer surface of this sleeve section constitutes the exposed decorative element of the hair band. The hair band is meant to be worn like a pair of sunglasses which have been casually pushed up above the forehead with the temple earpieces inserted into the hair on either side of the forehead.

It is thus an object of this invention to provide a foldable, decorative hair band that, when worn, resembles a pair of sunglasses that have been casually pushed up against the wearer's hair above the forehead, and which is easy to fold up and put away, in a purse or pocket, and carry when not being worn.

It is a further object of this invention to provide a foldable, decorative hair band that allows for the interchange of decorative designs to suit the wearer's taste or the occasion.

It is a further object of this invention to provide a low cost, practical, foldable decorative hair band which is simple to manufacture, is adaptable to different occasions and is easy to use.

These and other objects, advantages and features will become apparent to those skilled in the art when taken in conjunction with the description and accompanying drawings of a preferred embodiment.

DETAILED DESCRIPTION OF THE DRAWINGS

Figure 1:
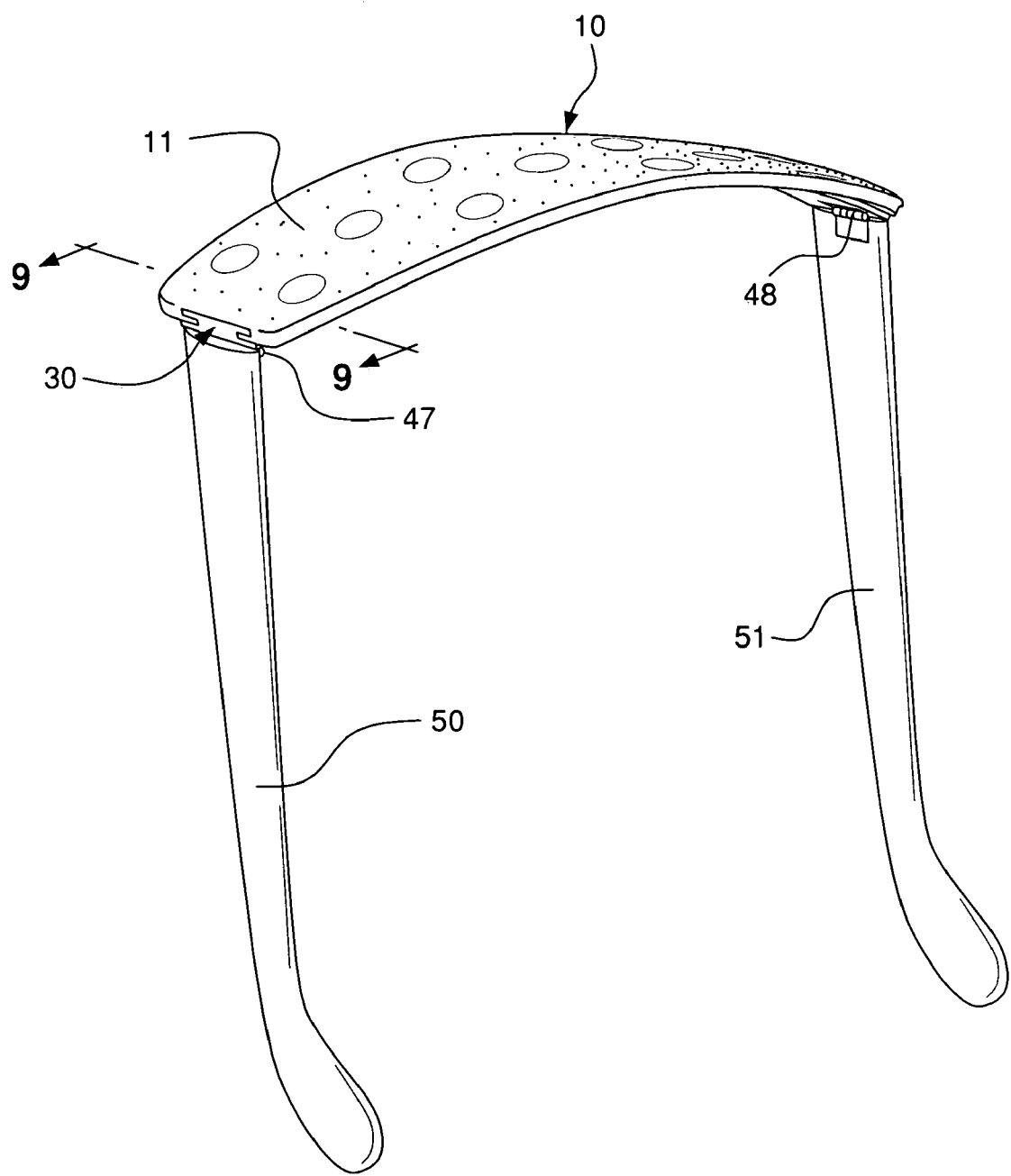
FIG. 1 is a perspective view of the assembled foldable hair band with the upper decorative, slotted sleeve plate slidably attached to the lower connecting bridging strip.

Referring now to FIGS. 1 to 10, a preferred embodiment of the foldable hair band is illustrated. In FIG. 1 it is shown in its assembled state and in FIG. 2 it is shown separated into its two main sections, the lower base section 60 and the upper decorative sleeve plate section 10. The lower base section 60 comprises the bridging strip 30, which in this embodiment has the form of a flattened train rail, to which is attached, at the opposite ends of its under face 38, the two temple earpieces 50 and 51 by the sunglasses folding hinges 47 and 48 respectively. The bridging strip 30 and the decorative plate 10 section will usually be referred to below, for brevity, as the "rail strip" 30 and the "decorative plate" 10, respectively. The rail strip 30 is of sufficient length to span the width of a forehead, which is about the length of the lens holding frame portion of sunglasses. The rail strip 30 is also bowed slightly outward to conform to the lateral curvature of a forehead, see FIGS. 1, 2, 5, 6, and 10.

Figure 9:
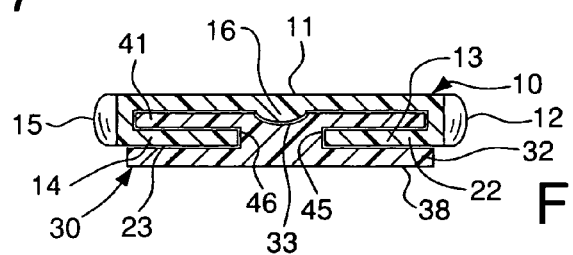
FIG. 9 is an elevation left end view of the decorative sleeve plate joined to the top of the bridging strip, cut along the line 9 of FIG. 1.

As indicated in FIGS. 2, 5, 6, 8, and 9, the rail strip 30 has the form of a flattened train rail with a flat upper face plate 31 partially separated from slightly wider lower plate 32, having a downward facing outer surface 38, by two narrow indented open channels 42 and 43. As illustrated here, each of these channels 42 and 43 runs along an opposite vertical narrow edge of the rail strip 30. The channels 42 and 43 are bounded internally by the narrow vertical walls 45 and 46, respectively, see FIGS. 5, 6, 8 and 9. Also indicated in FIGS. 2, 5 and 9, near the left end of the upper face plate 31 of the rail strip 30 is a small, essentially hemispherical hollow depression or "dimple" 33. Also, near the opposite right ends of the channels 42 and 43 are the small vertical channel barriers 34 and 35 respectively, see FIGS. 2, 5, 6 and 8. The dimple 33 and the barriers 34 and 35 serve as limiting stops when the decorative plate 10 is slidably attached to the rail strip 30. In FIG. 9 a vertical end cross section of the decorative plate 10 attached to the rail strip 30 is shown. In FIG. 9 the cross section of the upper plate of the rail strip 30 is indicated as 41 and the cross section of the lower plate is indicated as 32, also see FIG. 5.

Figure 2:
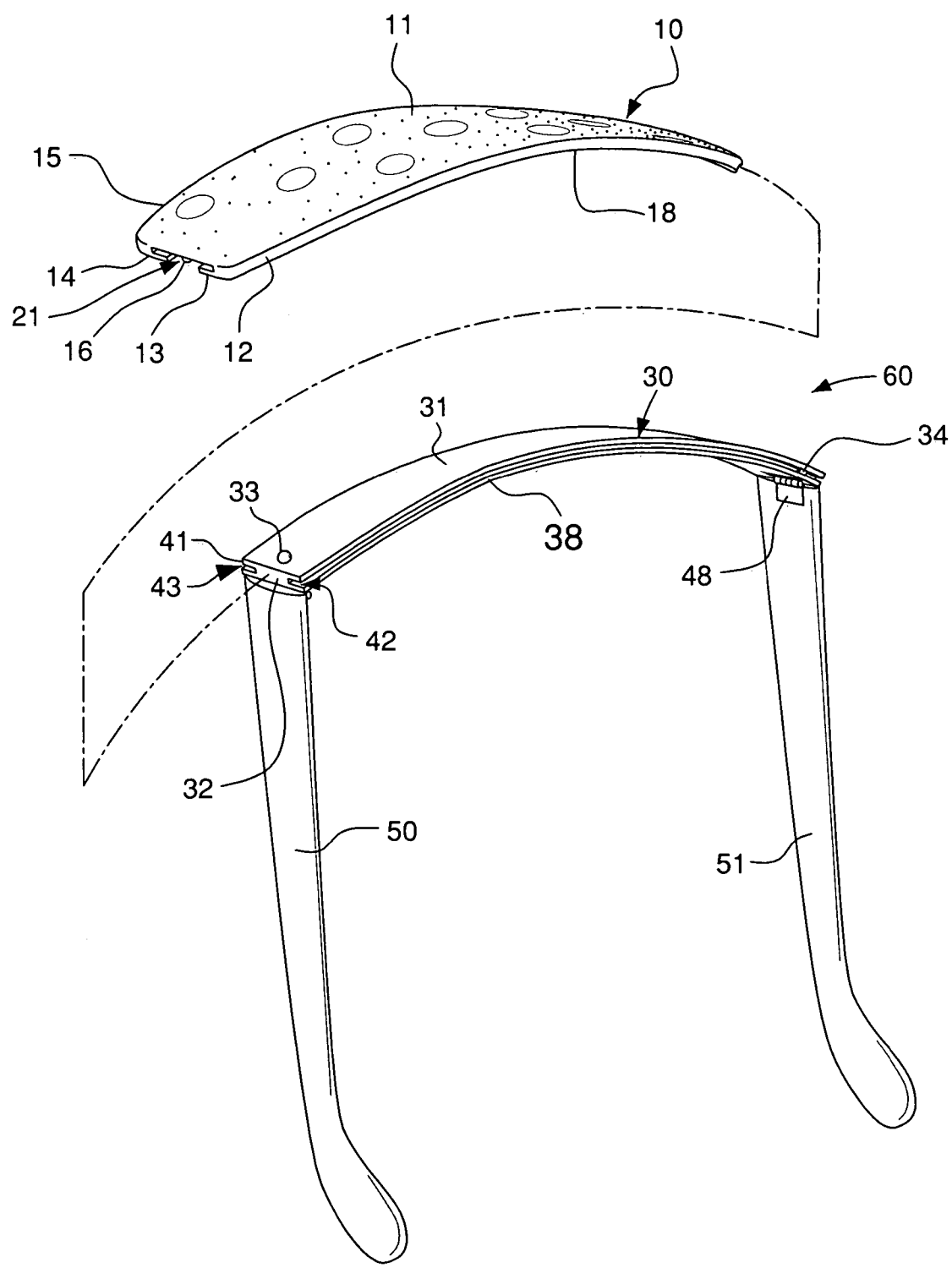
FIG. 2 is a perspective view of the disconnected foldable hair band with the upper decorative slotted sleeve plate positioned above the lower connecting bridging strip.
Figure 3:
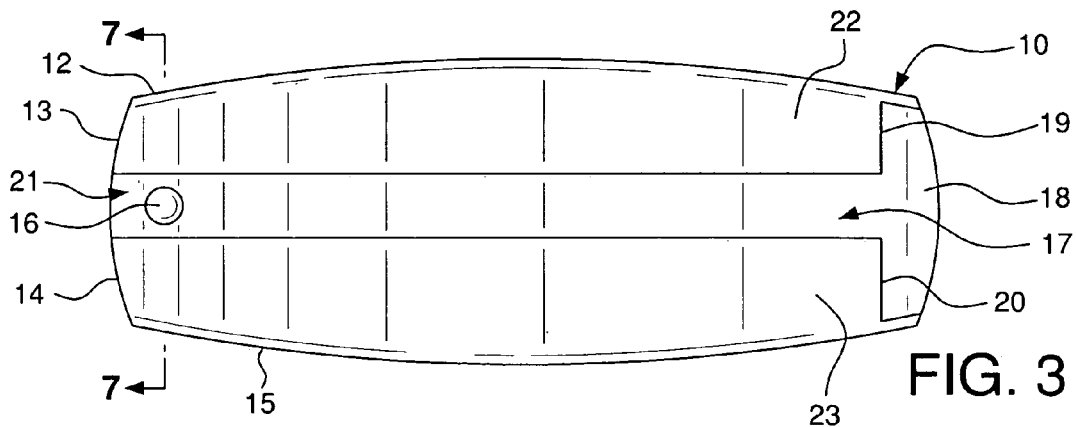
FIG. 3 is a bottom view of the decorative sleeve plate.
Figure 5:
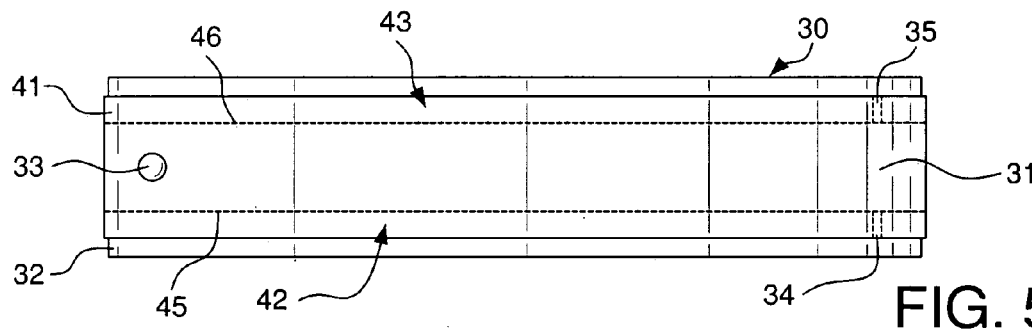
FIG. 5 is a top plan view of the connecting bridging strip.
Figure 4:
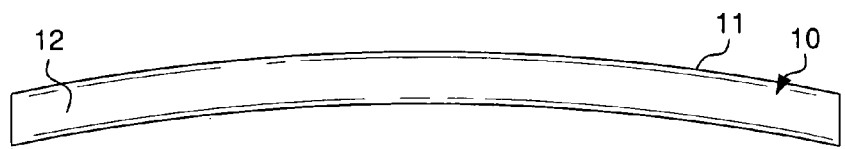
FIG. 4 is an elevation right side view of the decorative sleeve plate.
Figure 6:
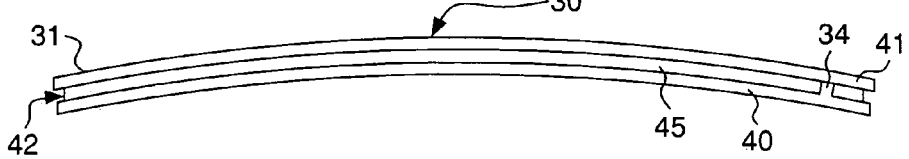
FIG. 6 is an elevation right side edge view of the bridging strip.
Figure 7:
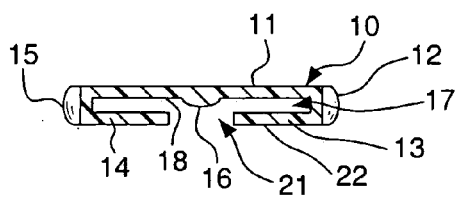
FIG. 7 is an elevation left end cross section view of the decorative sleeve plate, cut along the line 7 of FIG. 3.
Figure 8:
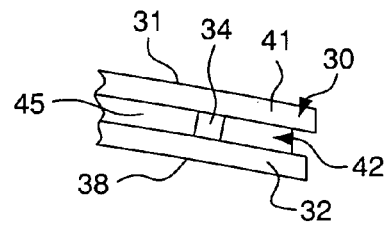
FIG. 8 is an elevation right side view of the channel barrier end of the bridging strip.
Figure 10:
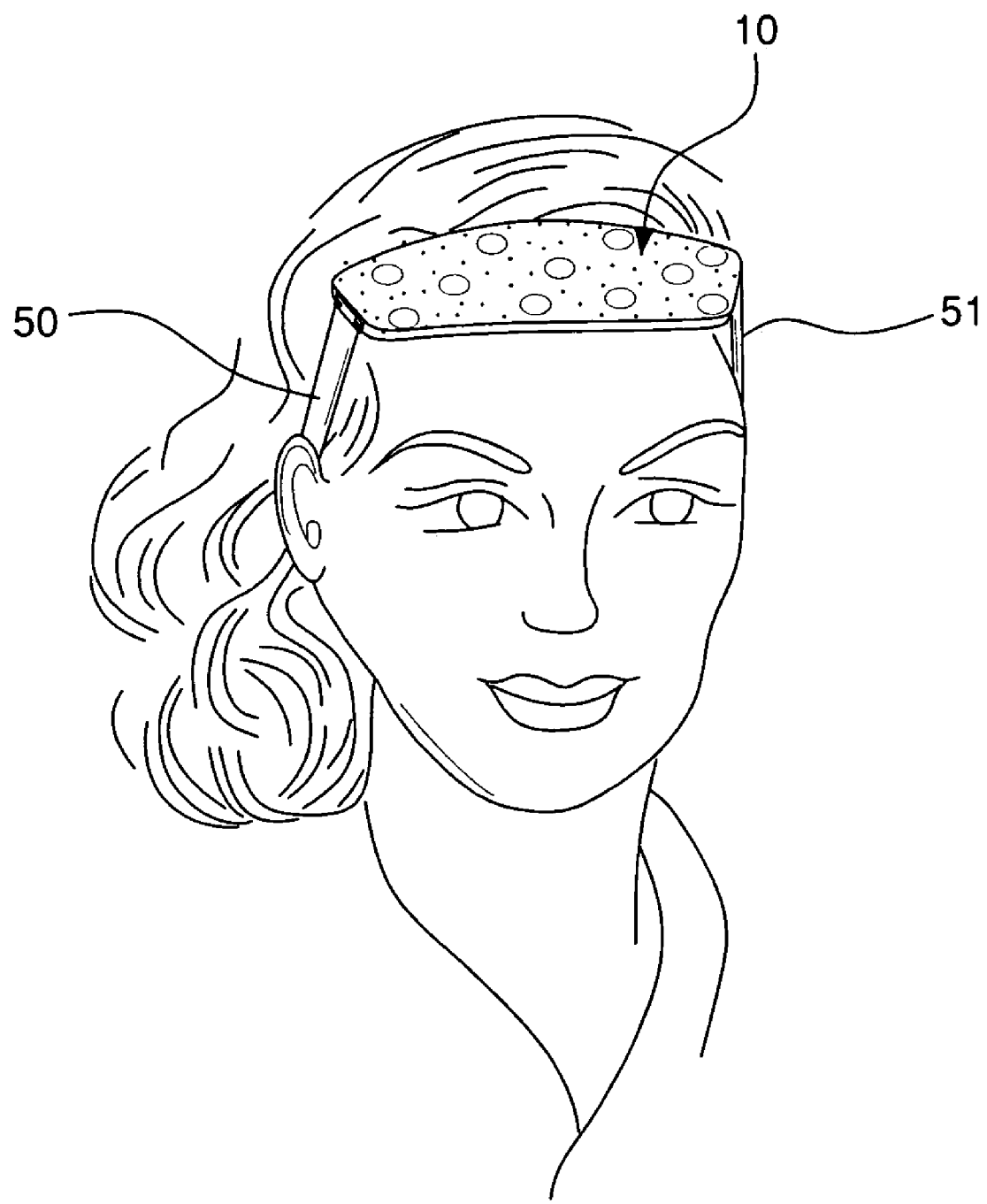
FIG. 10 is an illustration of a woman wearing the assembled foldable decorative hair band above her forehead with the temple earpieces inserted into her hair above her ears.

Referring to FIGS. 1, 2, 3, 4, 7 and 9, the upper decorative plate 10 is illustrated. The upper face 11 of the decorative plate 10 provides the decorative design of the hair band as indicated in FIGS. 1, 2 and 10. This decorative motif can be changed by changing the decorative plate 10. The decorative plate 10 is dimensioned to fit completely over the top surface 31 of the rail strip 30 and is slightly outwardly bowed to conform to the arcuate shape of the rail strip 30, see FIGS. 1, 2 and 4. The decorative plate 10 has the approximate cross sectional form of a flattened letter "C", where its two opposite lateral edge strips are folded under the top surface 11, forming the lower faces 22 and 23. The faces 22 and 23 do not completely cover the underside 18 of the decorative plate 10, but instead have inward directed vertical edges 13 and 14 respectively which bound an opening 21. This opening 21 fits across the section of the rail strip 30 bounded by the rail strip walls 45 and 46, see FIGS. 2, 3, 7 and 9. The open separation 17 between the underside 18 of the decorative plate 10 and the inward directed edges 13 and 14 creates a sleeve slot which is dimensioned to allow the decorative plate 10 to slide over and fit snugly about the top surface 31 of the rail strip 30, see FIGS. 1, 3, 7 and 9. Again referring to FIGS. 2 to 9, on the underside 18 of the decorative plate 10, near the left end of the sleeve slot 17, is a small approximately hemispherical protrusion 16, the "pimple". The pimple 16 is situated so that when decorative plate 10 is slid over and onto the rail strip surface 31, and the inward directed right end edges 19 and 20 of the decorative plate 10 meet the barrier stops 34 and 35 in the rail strip channels 42 and 43, near the corresponding opposite right end of the rail strip 30, the pimple 16 will then mate with the dimple 33 on the top surface 31 of the rail strip 30. The decorative plate 10 and the rail strip 30 will thus remain in stable attachment until it is desired to change the decorative plate 10. The semi-elastic flexible nature of the underlying structural material allows the decorative plate 10 to be manually detached from the rail strip 30. Also, as indicated in FIGS. 2, 3 and 4, the upper surface 11 of the decorative plate 10 extends a short distance beyond the right edges 19 and 20 of the sleeve slot 17. This allows the upper surface 11 of the decorative plate 10 to completely cover the upper surface 31 of the rail strip 30, when the edges 19 and 20 are in contact with, and stopped by, the barrier stops 34 and 35. Also, as shown in FIGS. 2, 3 and 4, the outer curved side walls 12 and 15 extend as far as the lateral edges of the upper surface 11 of the decorative plate 10. In FIG. 9 a cross section of the attached decorative plate 10 and rail strip 30 illustrate the relations between and locations of the various sections of these joined sections. Referring also to FIG. 7, it shows how the upper rail strip 30 cross section 41 fits into the sleeve slot 17, while the inward directed edges 13 and 14, bounding the sleeve slot 17, fit into the rail strip 30 channels 42 and 43 respectively, while the pimple 16 is mated to the dimple 33.

It is anticipated that, except for the folding metal hinges 47 and 48, the decorative plate 10, the rail strip 30 and the temple earpieces 50 and 51 will be made out of flexible, semi-elastic material, probably a molded plastic, which facilitates the connecting and disconnecting of the decorative plate and rail strip 30. In FIG. 10 one way to wear the foldable hair band is shown.

It will be understood that the above description of the present invention is susceptible to various modifications, changes and adaptations without departing from the spirit and scope of the present invention, and the same are to be comprehended within the meanings and range of the appended claims.

I claim:

1. A foldable decorative hair band having a first section comprising two temple sunglasses earpieces and a bridging strip, said temple earpieces attached by folding hinges to the opposite ends of the bottom surface of said bridging strip, said bridging strip being dimensioned to approximately match the surface dimensions, shape and surface area of sunglasses, and to extend across a wearer's forehead, when each of said temple earpieces is inserted into the wearer's hair on either side of the wearer's forehead, and wherein each of the two parallel, narrow, lateral edges of said bridging strip is provided with an indented channel, open ended on one end, spanning the length of said bridging strip, said bridging strip having the form of a flattened train rail, said foldable hair band further comprising a second section comprising a decorative plate, said decorative plate having a decorative design on its outer, upper surface, said decorative plate also being dimensioned to approximately match the surface dimensions, shape and surface area of sunglasses and to fit completely over said bridging strip, and wherein said decorative plate is formed into a partially open, flattened, sleeve having two narrow, parallel, lateral edge regions bent under said decorative plate so that said edges are directed inward and face each other across an open slot below the bottom surface of said decorative plate, thus forming a partially open sleeve having the cross section of a flattened letter "C", dimensioned to allow said decorative plate to slide over said bridging strip, as said inward directed edges of said decorative plate slide into said open channel ends of said bridging strip with said inward directed edges of said decorative plate snugly engaging said parallel lateral channels of said bridging strip, thus joining said decorative plate to said bridging strip, said joined bridging strip and decorative plate being sufficiently flexible to allow said decorative plate to be manually slid off said bridging strip when desired, said channels and sleeve thus providing means to attach and detach said first section to and from each other.

2. The foldable decorative hair band of claim 1, wherein said bridging strip and said decorative plate are provided with means for preventing them from sliding apart until manually separated after they have been attached to each other.

3. The foldable decorative hair band of claim 2, wherein said means for preventing said bridging strip and said decorative plate from sliding apart comprise a small stop barrier near one end of each channel on said bridging strip, said strip barriers preventing said inward directed edges of said decorative plate from passing on through said ends of said channels, when said sections are slid together, and also on the center line of the upper surface near the other end of said bridging strip, a small hemispherical depression is provided which matches the location of a small hemispherical protuberance provided on the center line of the underside of said decorative plate, said protuberance and said depression mating when said decorative plate is slid onto said bridging strip, thus requiring manual intervention to separate said decorative plate protuberance from said bridging strip depression in order to slide said sections apart.

4. The foldable decorative hair band of claim 1, wherein said bridging strip and said decorative plate are formed into matching outwardly bowed arcuate shapes which approximately conform to the natural curvature of a wearer's forehead.

* * * * *